US011645337B2

(12) United States Patent
Sofer et al.

(10) Patent No.: US 11,645,337 B2
(45) Date of Patent: May 9, 2023

(54) CLASSIFICATION BY OPTIMIZING REGULAR EXPRESSION RULES

(71) Applicant: International Business Machines Corporation, Armonk, NY (US)

(72) Inventors: Oded Sofer, Midreshet Ben Gurion (IL); Ofer Haim Biller, Midreshet Ben Gurion (IL)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 16/879,813

(22) Filed: May 21, 2020

(65) Prior Publication Data

US 2021/0365802 A1 Nov. 25, 2021

(51) Int. Cl.
*G06F 16/2455* (2019.01)
*G06F 16/903* (2019.01)

(52) U.S. Cl.
CPC .................. *G06F 16/90344* (2019.01); *G06F 16/24564* (2019.01)

(58) Field of Classification Search
CPC ..................... G06F 16/90344; G06F 16/24564
See application file for complete search history.

(56) References Cited

U.S. PATENT DOCUMENTS 8,055,652 B1 * 11/2011 Kumar ................ G06F 16/8373 707/716
9,734,343 B2 8/2017 Galil et al.
10,242,125 B2 3/2019 Lehavi et al.
10,339,141 B2 7/2019 Cafarella et al.
2005/0097514 A1 * 5/2005 Nuss ....................... G06F 8/425 717/114
2011/0093496 A1 * 4/2011 Bando ............... G06F 16/90344 707/769
2018/0181680 A1 * 6/2018 Revach ............ G06F 16/90348

OTHER PUBLICATIONS

Selective Regular Expression Matching, https://link.springer.com/chapter/10.1007/978-3-642-18178-8_20 Natalia Stakhanova; Hanli Ren; Ali A. Ghorbani; International Conference on Information Security; Oct. 28, 2010.

Paul Masurel; Of running multiple regexp at once, Oct. 23, 2013, https://fulmicoton.com/posts/multiregexp/.

Reparse; Python library/tools for combining and parsing using Regular Expressions in a maintainable way https://reparse.readthedoes.jo/en/latest/ printed on May 14, 2020.

* cited by examiner

*Primary Examiner* — Kannan Shanmugasundaram
(74) *Attorney, Agent, or Firm* — Brandon L. Stephens

(57) ABSTRACT

A computer-based system and method for optimizing execution of regular expression rules, each including one or more sub-rules, may include: testing, by a processor, the sub-rules against a data sample; measuring, by a processor and based on the testing, the probability for every sub-rule that it appears in the data sample, and the processing time of each sub-rule; and finding, by a processor, an order of execution of at least a subset of the sub-rules to shorten the total execution time of validating the regular expression rules, based to the probability and the execution time of each of the sub-rules.

20 Claims, 2 Drawing Sheets

DIVIDE REGEX RULES TO SUB-RULES — 110
CALCULATE POPULARITY — 120
TEST AGAINST DATA SAMPLE — 130
CALCULATE PROBABILITY FOR EVERY SUB-RULE THAT IT APPEARS IN THE DATA SAMPLE — 140
MEASURE PROCESSING TIME OF EACH SUB-RULE — 150
FIND AN ORDER OF EXECUTION — 160
EXECUTE THE SUB-RULES ACCORDING TO THE ORDER OF EXECUTION — 170

CLASSIFICATION BY OPTIMIZING REGULAR EXPRESSION RULES

FIELD OF THE INVENTION

The present invention relates generally to classifying data in a computerized or digital database, and specifically to classifying data in a database by regular expression rules.

BACKGROUND

Sensitive information (also referred to as sensitive data) requires strict security control, limited access and disclosure, and may be subject to legal restrictions. Sensitive information contained in records such as computerized databases of an organization may constitute an area of concern because of the risk to the organization should records be mishandled or information inappropriately accessed or disclosed. In addition, data protection laws and regulations such as Health Insurance Portability and Accountability Act (HIPAA), general data protection regulation (GDPR) and others, require users of sensitive data to put in place appropriate technical and organizational measures to implement data protection principles. Examples of sensitive data may include credit card numbers, health record identification numbers (ID) (HIPAA defines that as very sensitive), antenna numbers (may identify the location of the caller), salaries, band levels, employee IDs, etc.

Some categories of sensitive data or some categories of data in digital or computer databases may have unique patterns or may obey mathematic rules, which may be used to identify that data category. One tool for searching for patterns may include using regular expression rules. However, applying regex rules against all metadata and all data samples may take days and overload the database and computational infrastructure. Thus, it may be required to shorten the process and decrease its footprint.

SUMMARY

According to embodiments of the invention, a system and method for optimizing execution of regular expression rules, each comprising one or more of sub-rules may include testing, by a processor, the sub-rules against a data sample; measuring, by a processor and based on the testing, the probability for every sub-rule that it appears in the data sample, and the execution time of each sub-rule; and finding, by a processor, an order of execution of at least a subset of the sub-rules to shorten the total execution time of validating the regular expression rules, based to the probability and the execution time of each of the sub-rules.

According to some embodiments, finding the order of execution of the subset of sub-rules may be performed according to frequency of the subset of sub-rules, wherein the frequency of a sub-rule equals the number of regular expression rules that include the sub-rule.

Embodiments of the invention may include measuring, by a processor and based on the testing, execution time of the regular expression rules, and finding the order of execution of the subset of sub-rules further according to the execution time of the regular expression rules.

According to some embodiments, finding the order of executing the subset of sub-rules may be performed by solving a multidimensional dynamic programming problem.

Embodiments of the invention may include the sub-rules to classify examined data, where the subset of sub-rules may be executed according to the order of execution.

According to some embodiments, the sub-rules may be implemented using nondeterministic finite automaton.

According to some embodiments, the examined data may pertain to a computer database and the data sample comprises a portion of the database.

According to some embodiments, the order of execution may minimize a total execution time of validating the regular expression rules.

According to some embodiments, testing the sub-rules against the data sample may include executing the sub-rules against the data sample.

According to some embodiments, the regular expression rules may include sequence of characters that define a search pattern for finding a pattern of data.

Embodiments of the invention may include finding a new order of execution if the probability of the subset of sub-rules that they appear in the examined data is significantly different from the probability of the subset of sub-rules that they appear in the sample data.

According to embodiments of the invention, a system and method for optimizing execution of regular expressions, each comprising a plurality of sections, may include: executing, by a processor, the sections against a data sample; measuring, by a processor, a probability of matches for each section in a data sample, and the processing time of every section; and finding, by a processor, an order of executing the regular expressions to minimize the total run time, according to the probability of each of the sections, the processing time of each of the sections, and the number of regular expression rules that include each of the sections.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
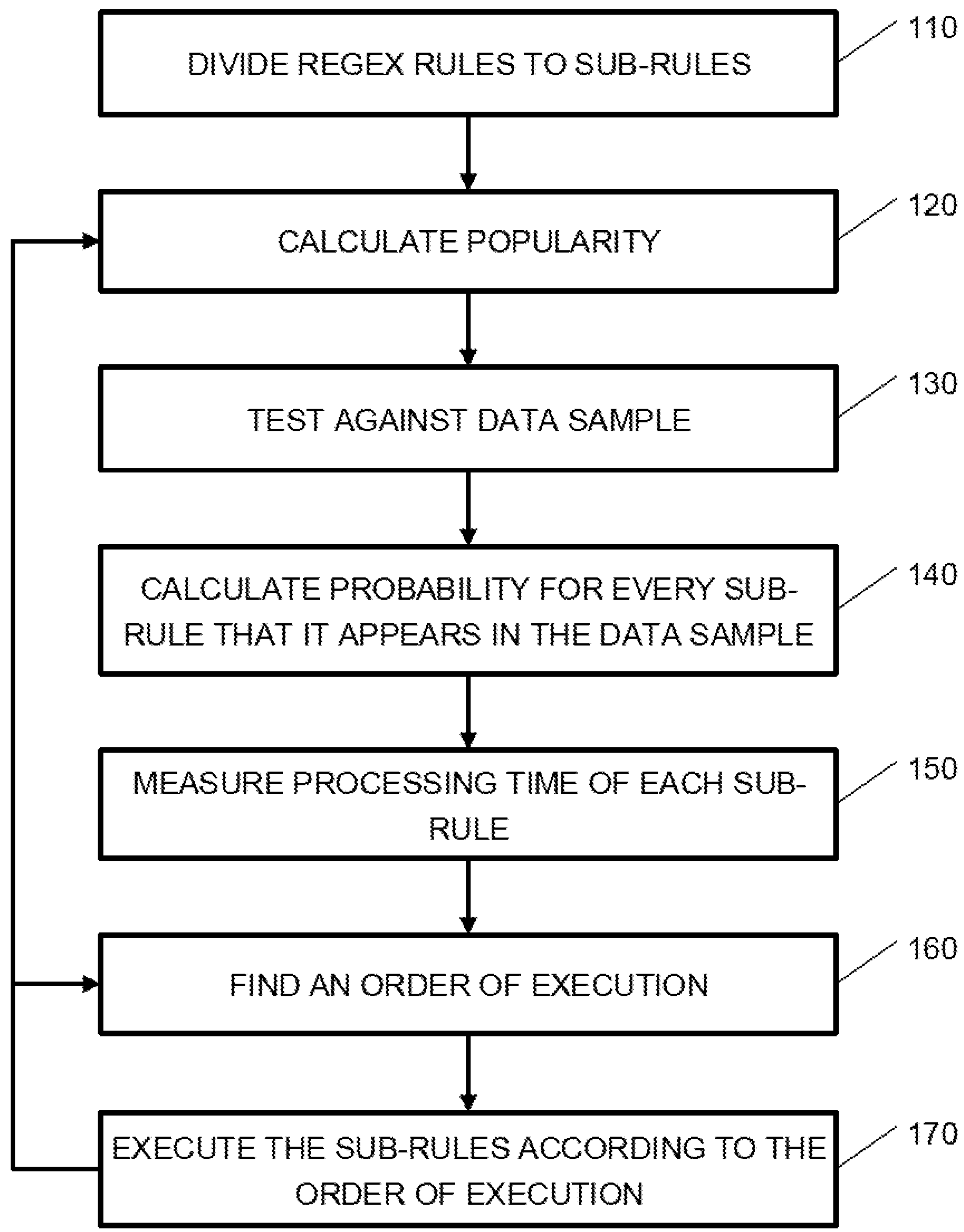
FIG. 1 is a flowchart of a method for data classification by regular expression rules, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining." "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example. "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

A database may include organized data stored in a computerized system. Data items in a database may be arranged at least logically as an array or a table of rows and columns (other types of organization may be used). Typically, a row in a database relates to a single entity and each column in the database stores an attribute associated with the entity. A column, sometimes referred to as subsection, includes data items that pertain to a single data category, also referred to as data type. A data category may include a distinct class to which data items belong. Data categories may include name, address, ID number, employee numbers rank, credit card number, etc. All data within a column or a data category typically has the same format (e.g. alphabetical, numeric, number, date, selection among a set of categories, etc.) and describes the same substantive attribute of the entity corresponding to a specific data item within the data having the same category. Data items may be alphabetical, alphanumeric, numerical, or other standard formats.

In many applications, each column in a database may have or include metadata, or a column header, associated with the data in the column. Metadata may be data identifying a data category or column in a database. Ideally, the metadata may include meaningful data describing characteristics of the data or data category without describing the specific entry or substantive data for a specific data item. For example, meaningful metadata for a date category may include "date" while the data itself, described by the metadata, may be Feb. 3, 1975.

Some of the data categories may be defined as sensitive data and some may not. For example, credit card numbers may be defined as sensitive data, while a number of television screens owned by a family may not. The definition of data category as sensitive may be internal to an organization or imposed on the organization by data protection laws and regulations.

Sensitive data stored by organizations may be subject to specific processing requirements. However, for many organizations, the first challenge involved with handling sensitive data is the identification of the sensitive data in the company databases. Organizations such as banks, credit card companies, insurance companies, hospitals, universities and many others, may have huge databases, some of which are rather old and designed long time before awareness to sensitive data has started. In many organizations the documentation of the structure of the databases is lacking.

A naïve method for identifying sensitive data in a database, or for identifying the category of data in a database, may include identifying the data category based on the metadata, e.g., the column header, associated with the data. For example, one would expect that the column header of credit card numbers would include the phrase 'credit card' or 'numbers' or some combination or abbreviation of both. However, in many real-life situations, the metadata is meaningless and inconsistent, e.g., different columns of the same category may have different meaningless names. For example, a column header of credit card numbers may be some combination of letters and numbers such as 'b-32-133'.

Therefore, classification of data items to data categories based on metadata may be highly inaccurate and inconclusive, and may result in many false-positive and false-negative classifications. False-negative classifications are problematic since sensitive data may not be recognized and proper provisions may not be taken. False-positive classifications may cause impractical deployment, since too many fields may need to be monitored, analyzed, audited and tracked in high-resolution. This may require very expensive resources allocation, too many security analysts and an auditor to review the outcome. Thus, improving the accuracy of the classification is very crucial.

Some categories of sensitive data or some categories of data in digital or computer databases may have unique patterns or may obey mathematic rules, which may be used to identify that data category. One tool for searching for patterns may include using regular expression rules. A regular expression rule (also referred to as a regex rule or simply regex) may include a sequence of characters that define a search pattern for finding a pattern of data or a certain amount of text in a searched string. A regex rule may include one or more literal characters and special meaning characters. Literal characters may be included in a regex rule for finding the first (or any) occurrence of those characters in the searched string. For example, a regular expression that includes the literal characters may be used to find the first (or any) occurrence of s in a string. Special meaning characters may be included in a regex rule to define non-printable characters, character sets or classes, searched patterns that match only one out of several characters, shorthand character classes, etc. For example, the special meaning characters \t may be used to match a tab character (that is a non-printable character), the special meaning characters \d may define a single character that is a digit (a character set), etc. Depending on the complexity of the searched string, regex rules may become quite complex. For example, regex for finding social security numbers (SSN) may include:

```
^(?!b(\d)1+–(\d)1+–(\d)1+b)(?!123-45-6789|219-09-999|078-05-1120) (?!666|000|9d{2})d{3}(?!00)d{2}(?!0{4})d{4}$
```

Thus, in an application for classifying data items in a database, the SSN regex may be applied to computerized data items (that are the examined strings in this application) of unknown types or categories. If a match is found, the matching data item obeys the regular expression rule defined for an SSN and is therefore likely to actually be an SNN. Therefore, the system may classify the matching data item as an SSN.

Regular expression rules may be used in a variety of computer based applications, including finding a text pattern in test documents, searching the internet, classifying data items in databases, packet matching, intrusion detection, etc. While embodiments of the invention will be demonstrated herein for finding sensitive data in databases, this may serve as an example only, and embodiments of the invention may apply to other regex applications as well. For each application, the examined data, e.g., a data item in a database, a packet in a computer network, a searched file etc., may include a string of input symbols.

Matching strings against a regular expression may be performed in a sequential manner, e.g., the string of input symbols may be searched serially for appearances of the regular expressions. Common methods for matching strings against a regular expression include deterministic finite automaton (DFA) and nondeterministic finite automaton (NFA). Solving a regular expression with DFA and NFA includes translating the regular expression to a state machine that can perform pattern matching on strings. A state in the state machine may represent a condition included in the regex. For example, if a regex includes the literal characters as a required symbol in a sequence, a state for an occurrence of the literal character s may be defined in the state-machine. If the regex includes the literal character s as a required first symbol in a sequence, the state for an occurrence of the literal character s may be defined in the state-machine as an initial state. An accepting state may include a state in the state machine that represents a match, e.g., that only strings that match the regex reach that state. When a regex is applied to a string, the symbols of the strings are tested against the states of the state-machine. For each input symbol, the state machine may perform one or more applicable transitions to one or more following states until all input symbols have been consumed. If an applicable transition a reach an accepting state, a match is found.

However, the main disadvantage of both DFA and NFA based approaches for matching regex is the large computational complexity of both methods. For example, NFAs were shown to be inefficient due to a large number of active states, and implementing DFAs may require an extremely large number of states that may lead infeasible computer memory requirements. In addition, identifying a plurality of regex rules in large amounts of data may take long time and overload the computational resources of the organization. For example, identifying sensitive data on many databases, where different types or categories of sensitive data may be identified by different regex rules, and where every database may have thousands of tables and each table may have tens of columns, may require running all the regex rules against all metadata and all data samples in the database. Given a sample set of about 10,000 records, running or executing all the required regex rules against all metadata and all data samples may take days and overload the database and computational infrastructure. Thus, it may be required to shorten or reduce the process and decrease its footprint.

Embodiments of the invention may provide an automatic and computerized method for optimizing execution of regular expression rules. Embodiments of the invention may improve the technology of regex matching by reducing the number of comparisons required. Thus, the computational complexity of string matching to regex rules may be dramatically decreased and the computational power required may be reduced. Improving regex matching may improve any technology in which regex matching is used, including but not limited to finding a text pattern in test documents, searching the internet, classifying data items in databases, packet matching, intrusion detection, etc.

According to embodiments of the invention, each of a plurality of regular expression rules may be divided into one or more of segments or sub-rules. The sub-rules may be tested against a data sample to obtain a probability for every sub-rule that it appears (e.g., has a match) in the data sample, and the processing time (or other measure of processing power) required of each sub-rule. In some embodiments, the processing time (or other measure of processing power) required of each regex rule, is measured as well. In some embodiments, the frequency of the sub-rules, e.g., the number of regex rules that include the sub-rule, is calculated as well. Embodiments of the invention may provide, based on the data gathered from the tests and the frequency, an optimized order of execution of the sub-rules (or a portion or subset of the sub-rules) for decreasing or minimizing the number of matching operations required for validating the regular expression rules. The order of execution of the sub-rules may substantially influence the total run time or execution time of the regex match. Thus, optimizing the order of execution of all the sub-rules may substantially shorten or reduce the total run time or execution time of the regex match.

Looking at each of those parameters alone, a sub-rule that requires short processing time (or lower processing power) is preferable over a sub-rule that requires longer processing time (or higher processing power), a sub-rule that rarely appears or matches in the data sample is preferable over a sub-rule that appears or matches in the data sample more frequently, a sub-rule that appears in a regex rule that requires longer processing time (or higher processing power) is preferable over a sub-rule that appears in a regex rule that requires shorter processing time (or lower processing power), and a sub-rule that repeats in many regex rules is preferable over a sub-rule that repeats in fewer regex rules. Embodiments of the invention, however, may optimize the order of a sub-rule execution by considering some or all of those parameters, e.g., processing time, probability and frequency.

For example, according to embodiments of the invention, a sub-rule that requires short processing time, rarely appears in the data sample, and repeats in many regex rules, may be performed before a rule that requires longer processing time, appears more frequently in the data sample, and repeats in less regex rules.

Reference is made to FIG. 1, which is a flowchart of a method for optimizing execution of regular expression rules, according to embodiments of the invention. An embodiment of a method for optimizing execution of regular expression rules may be performed, for example, by the systems shown in FIG. 2. An embodiment of a method for optimizing execution of regular expression rules may be used for classifying data of an unknown category, based on regular expression rules of known data categories.

In operation 110, a processor (or a user) may divide the regex rules into segments, also referred to as sub-rules. For example, the regex for finding SNN may be divided into segments or sub-rules as detailed in table 1.

TABLE 1

<table>
<tr><th colspan="2">example sub-rules for finding SSN.</th></tr>
<tr><th>Sub-rule (Segment)</th><th>Explanation</th></tr>
<tr><td>^</td><td>Start of expression</td></tr>
<tr><td>(?!b(\d)1+–(\d)1+–(\d)1+b)</td><td>Do not allow all matching digits for every field</td></tr>
<tr><td>(?!123-45-6789|219-09-9999|078-05-1120)</td><td>Do not allow “123-45-6789”, “219-09-9999” or “078-05-1120”</td></tr>
<tr><td>(?!666|000|9\d{2})\d{3}</td><td>Do not allow the SSN to begin with 666, 000 or anything between 900-999</td></tr>
<tr><td>-</td><td>A dash (separating Area and Group numbers)</td></tr>
<tr><td>(?!00)\d{2}</td><td>Do not allow the Group Number to be “00”</td></tr>
<tr><td>-</td><td>Another dash (separating Group and Serial numbers)</td></tr>
<tr><td>(?!0{4})\d{4}</td><td>Do not allow last four digits to be “0000”</td></tr>
<tr><td>$</td><td>End of expression</td></tr>
</table>

As noted, classification may be performed by applying a regex rule to data items of unknown types or categories and categorizing the data item to a specific data category if a match to a regex rule of that category is found. The same holds true after dividing the regex rule into segments; a data item may be categorized to a specific data category if a match to all the sub-rules of a regex rule of that category is found.

A naïve approach for categorizing data would, therefore, include applying each of the segments of each of the regex rules sequentially. In some application, some parallelism may be achieved using parallel computing. However, typical computer applications using such rules may include tens of regex rules, each divided to 5-15 segments. Thus, typically, over one hundred segments may have to be applied to each data item. This may be very time consuming a computationally intensive.

However, it is enough that one sub-rule of a regex rule would not match a data item, for this data item to not be categorized as pertaining to the data category of the regex rule. Thus, reordering the execution of sub-rules as disclosed herein may significantly affect the overall execution time of the entire set of regex rules, without changing the quality of the classification results. e.g., without increasing the false positive or false negative rate.

In operation 120, a processor may calculate or determine a popularity or frequency of at least one or all of the sub-rules. The popularity or frequency of a sub-rule may equal the number of regex rules that include the sub-rule. According to embodiments of the invention, sub-rules with higher frequencies may have higher priority over sub-rules with lower frequency when sequencing regex sub-rules, since such sub-rules may filter input strings more efficiently.

In one example, the sub-rule “(?!0{4})\d(4)”, that is a segment of the SSN regex, is a segment of a credit-card regex as well. Thus, the popularity of the sub-rule (?!0{4})\d{4} in this example equals two. In this example, sub-rule (?!123-45-6789|219-09-9999|078-05-1120) appears only in the SSN regex. Thus, the popularity of the sub-rule (?!123-45-6789|219-09-9999|078-05-1120) in this example equals one. Therefore, applying sub-rule (?!0{4})\d{4} over examined data may provide candidates for two regex rules, while applying sub-rule (?!123-45-6789|219-09-9999|078-05-1120) may provide candidates for a single regex only. Said differently, data items that do not match sub-rule (?!0{4})\d{4} are known to not be neither an SSN nor a credit card number. Thus, after applying sub-rule (?!0{4})\d{4}, there is no need to apply any other sub-rules of both the SSN regex and the credit card regex to any data items that did not match sub-rule (?!0{4})\d{4}. However, after applying sub-rule (?!123-45-6789|219-09-9999|078-05-1120), there is no need to apply any other sub-rules of only the SSN regex to data items that did not match sub-rule (?!123-45-6789|219-09-9999|078-05-1120). Thus, according to embodiments of the invention, sub-rule (?!0{4})\d{4} may have higher priority over sub-rule (?!123-45-6789|219-09-9999|078-05-1120), at least in terms of frequency. Thus, frequency of sub-rules may be used as parameter for sequencing sub-rules execution. However, embodiments of the invention may prioritize execution (e.g., determine an order of execution) of sub-rules based on more than one parameter, as disclosed herein.

In operation 130, a processor may test the plurality of sub-rules or segments against a data sample. For example, the data sample may include a part or a portion of a database. In some embodiments, testing the sub-rules against the data sample may include executing or running all the sub-rules or segments on the data sample. Operations 140 and 150 may be performed while performing the test in operation 130, or based on log files and other data provided in operation 130.

In operation 140, a processor may measure or estimate a probability for every sub-rule that it appears in the data sample, or the probability of matches for every sub-rule in a data sample, referred to herein as the probability of a sub-rule. For example, the processor may count the number of matches for each of the sub-rules and the total number of input strings (e.g., data items) in the data sample. The processor may calculate the probability of matches for a sub-rule by dividing the number of matches of the sub-rule by the total number of input strings.

In operation 150, a processor may measure the run-time, processing time, computation time or execution time (or any other measure of processing power) of each of the sub-rules tested. In some embodiments, the processor may measure the total processing time, computation time or execution time (or any other measure of processing power) of each of the regex rules. For example, the execution time may be measured by inserting a command that prints the current time, usually with resolution of microseconds or milliseconds, before and after execution of each sub-rule to a log file, and calculating the execution time of a sub-rule by subtracting the time printed after executing the sub-rule from the time printed before executing the sub-rule. Other methods for measuring the execution time may be used.

In one example, test results have shown that execution time of sub-rule (?!00)\d{2} included in the SSN regex may be shorter than the execution time of sub-rule (?!666|000|9\d{2})\d{3}, also included in the SSN regex.

Thus, when looking at execution time as a single parameter for optimizing sub-rule execution, it may be beneficial to execute sub-rule (?!00)\d{2} before sub-rule (?!666|000|9\d{2})\d{3}. This is because sub-rule (?!00)\d{2} would take less time to run than sub-rule (?!666|000|9\d{2})\d{3}.

In the same example, test results have shown that the probability of sub-rule (?!00)\d{2} included in the SSN regex may be higher than the probability of sub-rule (?!666|000|9\d{2})\d{3}, also included in the SSN regex. Thus, when looking at the probability as a single parameter for optimizing sub-rule execution, it may be beneficial to execute sub-rule (?!666|000|9\d{2})\d{3} before sub-rule (?!00)\d{2}. This is because sub-rule (?!666|000|9\d{2})\d{3} may exclude more irrelevant data items (e.g., data items that are not SSNs) than sub-rule (?!00)\d{2}.

According to embodiments of the invention, each of the execution time, the probability, and the frequency of sub-rules may be used as parameter for optimizing the sequencing sub-rules execution. In operation 160, a processor may use optimization techniques to prioritize execution of sub-rules (e.g., determine an order of execution of sub-rules, for example, determining which sub-rule would be executed first, which would be executed second, etc.) based on one or more parameters. Embodiments of the invention may choose the best order to apply the regex rule. The parameters used may include any combination of the execution time of the sub-rules or segments, the execution time of the regex rules, the probability, and the frequency of sub-rules. According to some embodiments, the process may also determine the parallel run. e.g., the division of sub-rules to processing threads in parallel processing. In some embodiments, the processor may use optimization techniques to prioritize execution of all the sub-rules of the regex rules. In some embodiments, the processor may use optimization techniques to prioritize execution of a portion of the sub-rules of the regex rules.

In some embodiments, dynamic programming may be used to find the optimal order of sub-rule execution. Specifically, the optimization problem may be formatted as multidimensional dynamic programming problem and solved efficiently using dynamic programing. For example, let the set of regex to be computed be denoted as $R_1$, $R_2$ . . . $R_n$. For each regex Ri the average execution or computation time measured in operation 150 may be denoted as $T_i$. Regex segments or sub-rules may be denoted as $S_1$, $S_2$ . . . $S_m$. It is noted that it is not mandatory that all the segments or sub-rules of all the regexes be included in the optimization process. Thus, the optimization process may include all the segments or sub-rules of all the regexes, or just a sub-set or a portion of the sub-rules or segments. Notice that performing this optimization for any subset of segments which will be extracted from the regexes may provide a faster expected execution time or in the worst-case equal execution time comparing to the original (e.g., random) execution time. According to some embodiments, a sub-rule may be either mandatory or nested. By definition, if a mandatory sub-rule is not matched, the whole regex could not be matched. However, some regex rules may include two or more sub-rules that are alternative to each another. Those alternative sub-rules are considered as nested, and it is required that all of those nested sub-rules would not match to determine that the whole regex could not be matched.

For simplicity of the explanation, the following exemplary algorithm is applied for determining the order of execution of mandatory sub-rules only. In this example, the mandatory sub-rules may be executed first in a first stage of the calculation (e.g., in operation 170) according to or in the order determined, and the rest of the sub-rules, e.g., the nested sub-rules, may be executed afterwards in a second stage of the calculation. It should be readily understood by those skilled in the art that the same principles may be augmented to consider nested sub-rules as well.

Let the average execution or computation time for a segment or sub-rule $S_i$, measured in operation 150 may be denoted as $TS_i$. The probability of a match for a segment or sub-rule $S_i$, measured in operation 140 may be denoted as $PS_i$. RS(r,s) may denote a binary function which is true if regex r contains a mandatory segment s and false otherwise. The calculated cost function may provide the total calculation time expectancy, given the segments to be included in the first stage of the calculation, and the order of their execution. The regexes which are not fully covered by the segments in the first stage of the calculation, may be matched in the second stage of the calculation. The optimization may find the optimal order of the segments (e.g., the order of execution that would minimize the total execution time of the entire set of regexes) to be included in the first stage of the calculation.

To enable solving the optimization problem as dynamic programming, an initial cost function may be defined for executing no segments in the pre-calculation, and a recursive phrasing of the cost function may be provided. The recursive format may enable traveling gradually on the solutions space using prior results to find optimal solution. For example, the initial cost function for executing no segments in the pre-calculation may include:

$$\mathrm{Cost}(\{\ \})=T_i\Sigma_{i=0}^{n}T_i$$

The recursive phrasing of the cost function, Cost(S=$\{s_{l1}, s_{l2}, \ldots, s_{lk}\}$), may include:

$$\mathrm{TimeReduction}(S=\{s_{l1},s_{l2}\ldots,s_{lk}\},s_i)=$$

$$=\Sigma_{j=0}^{n}T_j \text{ if } RS(j,i) \text{ is true and } RS(j,k) \text{ is false for any } l \text{ in } l1{:}lk$$

$$p\mathrm{Cost}(S=\{s_{l1},s_{l2}\ldots,s_{lk}\},s_i)=\mathrm{Cost}(S)+TS_i-(1-PS_i)*\mathrm{TimeReduction}(S,s_i)$$

$$\mathrm{Cost}(S=\{s_{l1},s_{l2}\ldots,s_{lk}\})=\mathrm{MIN}[\text{for each } s_i \text{ in } S{:}p\mathrm{Cost}(S\backslash s_i,s_i)]$$

Thus, to minimize the cost per a set of segments $\{s_1, s_2 \ldots, s_k\}$ the minimum cost between the k different options may be found. In each option a different segment may be selected to be the last one added. Therefore, the minimal cost for all segments except the last one (already calculated according to the dynamic programming paradigm) may be considered, and the cost delta with the addition of that last segment may be calculated. Since the minimum value on all the options is selected, the minimal cost for the given set of segments is obtained.

According to some embodiments, other optimization methods may be used. In one embodiment, ant colony optimization (ACO) may also be implemented to find the optimal order of sub-rule execution when running multi-processers in parallel, taking into account the run time, the popularity and the probability. According to some embodiments of the invention, a regex may be represented (e.g. stored as a digital data representation) in the form of a decision tree algorithm, also referred to as a regex tree. The regex tree may be a hierarchical structure including a plurality of subtrees, each rooted in a root node. Each regex may be divided into segments, where each node in a regex tree may represent a segment. Each node may have children nodes, each representing longer segments. The regex tree may include the probability of every sub-regex that it appears or matches in the data sample and may the used to find the order of execution of regex sub-rules and for determining the parallel run, e.g., the division of sub-rules to processing threads in parallel processing.

In operation 170, a processor may execute the sub-rules according to the order of execution to classify examined data. Thus, the sub-rules may be implemented in the order determined in operation 160. For example, the examined data may include uncategorized data items in a database, packets in a computer network, etc. The regex rules may be used to classify the uncategorized data items in a database. The output of operation 170 may include classification of uncategorized data items into categories. For example, a data item that matches a regex rule may be classified or categorized to the class or category of the regex rule. The regex rules may be implemented, in the determined order, using an NFA or a DFA algorithm. According to embodiments of the invention, using the order of sub-rules execution found in operation 160 may minimize or at least considerable shorten or reduce the total execution time of validating the regular expression rules against the examined data.

According to some embodiments of the invention, the method may return to operation 120 if the regex rules are changed, or to operation 140 if the probability of sub-rules that they appear in the examined data (e.g., the probability that sub-rules has matches in the examined data) is significantly different than the probability previously measured in operation 130. According to some embodiments, the probability of each sub-rule that it appears in the examined data may be measured in run time, e.g., while the examined data is being classified in operation 170. If the probability significantly changes, e.g., as determined by a statistical test or if the difference is above a threshold e.g. greater than +-20% difference, then operation 160 may be repeated to find or recalculate a new order for executing the sub-rules.

Figure 2:
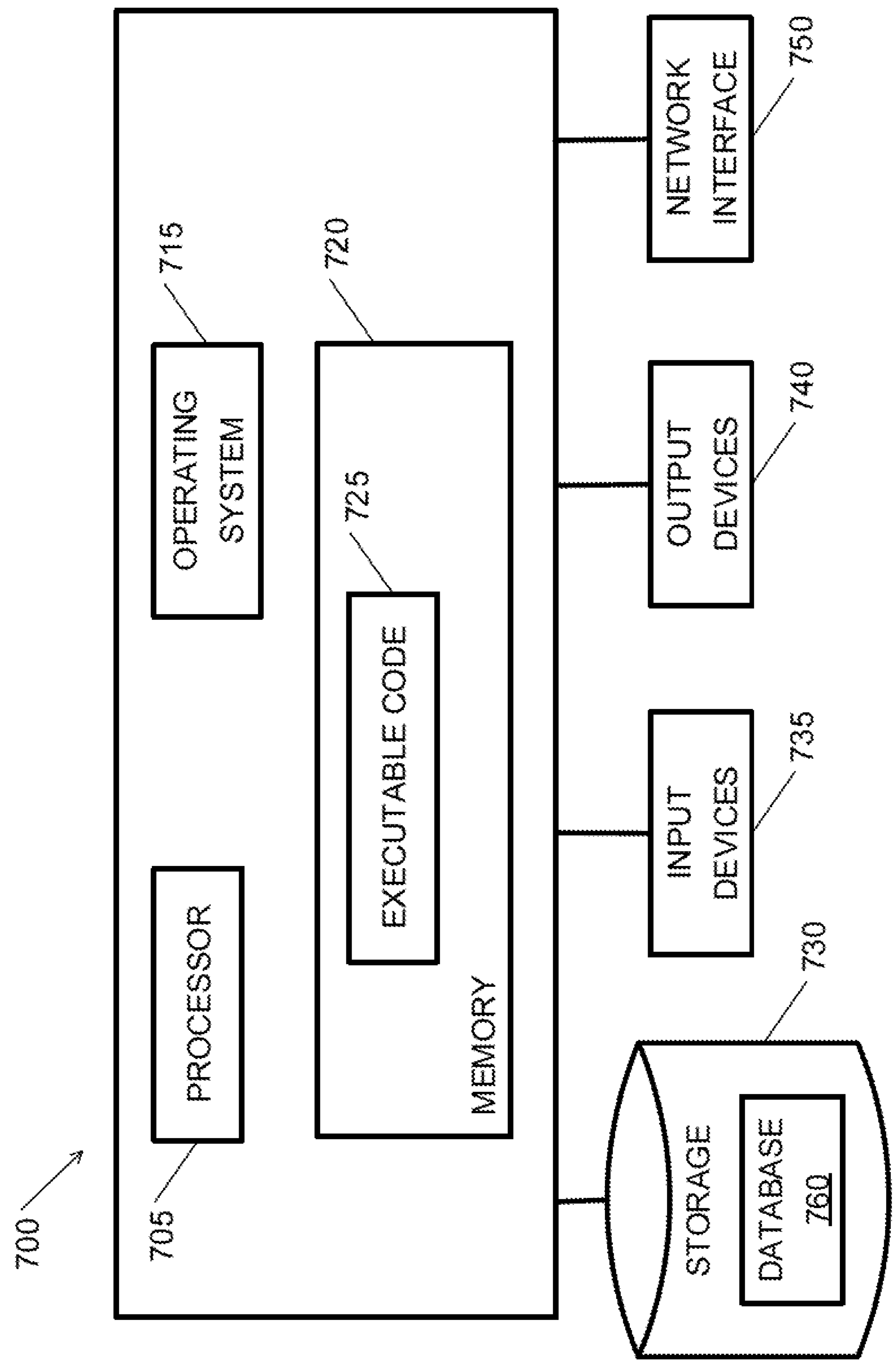
FIG. 2 illustrates an example computing device according to an embodiment of the invention.

FIG. 2 illustrates an example computing device according to an embodiment of the invention. For example, a first computing device 700 with a first processor 705 may be used to classify examined data in a computerized database, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer, or may be at least partially implemented by one or more remote servers (e.g., in the "cloud").

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Operating system 715 may be or may include any code segment designed and/or configured to provide a virtual machine, e.g., an emulation of a computer system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include software for optimizing execution of regular expression rules, according to embodiments of the invention. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Storage 730 may include or may store one or more databases 760. In some embodiments, some of the components shown in FIG. 2 may be omitted. For example, memory 720 may be a non-volatile memory having the storage capacity of storage 730. Accordingly, although shown as a separate component, storage 730 may be embedded or included in memory 720.

Database 760 may include data organized in any applicable manner. Typically, the data in database 760 may be divided logically into columns, where data in a column pertains to a single data category. In many applications, each column in a database may have or include metadata associated with the data in the column. Database 760 may be at least partially implemented by one or more remote storage devices 730 (e.g., in the "cloud").

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A computer implemented method for optimizing execution of regular expression rules, each comprising a plurality of sub-rules, the method comprising:

testing, by a processor, the sub-rules in a data sample that includes a plurality of regular expressions;

measuring, by a processor and based on the testing, a probability for every sub-rule that it appears in the data sample, and the execution time of each sub-rule; and finding, by a processor, an order of execution of at least a subset of the sub-rules to shorten the total execution time of validating the regular expression rules, based on a probability of co-occurrence of at least one sub-rule among different regular expressions and the execution time of the sub-rules, wherein a sub-rule that requires short processing time or lower processing power is prioritized over a sub-rule that requires longer processing time or higher processing power, a sub-rule that rarely appears or matches in the data sample is prioritized over a sub-rule that appears or matches in the data sample more frequently, a sub-rule that appears in a regular expression rule that requires longer processing time or higher processing power is prioritized over a sub-rule that appears in a regular expression rule that requires shorter processing time or lower processing power, and a sub—rule that repeats in many regular expression rules is prioritized over a sub-rule that repeats in fewer regular expression rules.

2. The method of claim 1, wherein finding the order of execution of the subset of sub-rules is performed according to frequency of the subset of sub-rules, wherein the frequency of a sub-rule equals the number of regular expression rules that include the sub-rule.

3. The method of claim 2, comprising:

measuring, by a processor and based on the testing, execution time of the regular expression rules, wherein finding the order of execution of the subset of sub-rules is performed according to the execution time of the regular expression rules.

4. The method of claim 1, wherein finding the order of executing the subset of sub-rules is performed by solving a multidimensional dynamic programming problem.

5. The method of claim 1, comprising:

executing the sub-rules to classify examined data, wherein the subset of sub-rules are executed according to the order of execution.

6. The method of claim 5, wherein the sub-rules are executed using nondeterministic finite automaton.

7. The method of claim 5, wherein the examined data pertains to a computer database and the data sample comprises a portion of the database.

8. The method of claim 1, wherein testing the sub-rules in the data sample comprises executing the sub-rules against the data sample.

9. The method of claim 1, wherein the regular expression rules comprise sequence of characters that define a search pattern for finding a pattern of data.

10. The method of claim 1, comprising, finding a new order of execution if the probability of the subset of sub-rules that they appear in the examined data is significantly different from the probability of the subset of sub-rules that they appear in the sample data.

11. A computer implemented method for optimizing execution of regular expressions, each comprising a plurality of sections, the method comprising:

executing, by a processor, the sections in a data sample that includes the regular expressions;

measuring, by a processor, a probability of matches for each section of a portion of the sections in a data sample, processing time of every section of the portion of the sections, and processing time of every regular expression; and solving, by a processor, an optimization problem to find an order of executing the sections of the portion of the sections to minimize the total run time, according to a probability of co-occurrence of at least one section among different regular expressions, the processing time of each of the sections of the portion of sections, the processing time of the regular expressions, and the number of regular expression rules that include each of the sections of the portion of sections, wherein a section that requires short processing time or lower processing power is prioritized over a section that requires longer processing time or higher processing power, a section that rarely appears or matches in the data sample is prioritized over a section that appears or matches in the data sample more frequently, a section that appears in a regular expression rule that requires longer processing time or higher processing power is prioritized over a section that appears in a regular expression rule that requires shorter processing time or lower processing power, and a section that repeats in many regular expression rules is prioritized over a section that repeats in fewer regular expression rules.

12. A system for optimizing execution of regular expression rules, each comprising a plurality of sub-rules, the system comprising:

a memory; and a processor configured to:

test the sub-rules in a data sample that includes regular expressions;

measure, based on the testing, the probability for every sub-rule that it appears in the data sample, and the execution time of each sub-rule; and find an order of execution of at least a subset of the sub-rules to shorten the total execution time of validating the regular expression rules based on a probability of co-occurrence of at least one sub-rule among different regular expressions and the execution time of each of the sub-rules, wherein a subset of the sub-rules that requires short processing time or lower processing power is prioritized over a subset of the sub-rules that requires longer processing time or higher processing power, a subset of the sub-rules that rarely appears or matches in the data sample is prioritized over a subset of the sub-rules that appears or matches in the data sample more frequently, a subset of the sub-males that appears in a regular expression rule that requires longer processing time or higher processing power is prioritized over a subset of the sub-rules that appears in a regular expression rule that requires shorter processing time or lower processing power, and a subset of the sub-rules that repeats in many regular expression rules is prioritized over a subset of the sub-rules that repeats in fewer regular expression rules.

13. The system of claim 12, wherein the processor is configured to find the order of execution of the sub-rules according to frequency of the sub-rules, wherein the frequency of a sub-rule equals the number of regular expression rules that include the sub-rule.

14. The system of claim 12, wherein the processor is configured to:

measure execution time of the regular expression rules; and find the order of execution of the subset of sub-rules according to the execution time of the regular expression rules.

15. The system of claim 12, wherein the processor is configured to find the order of executing the subset of sub-rules by solving a multidimensional dynamic programming problem.

16. The system of claim 12, wherein the processor is configured to:

execute the sub-rules to classify examined data, wherein the subset of sub-rules are executed according to the order of execution.

17. The system of claim 15, wherein the processor is configured to execute the sub-rules by using nondeterministic finite automaton.

18. The system of claim 15, wherein the examined data pertains to a computer database and the data sample comprises a portion of the database.

19. The system of claim 12, wherein the processor is configured to test the sub-rules in the data sample by executing against the data sample.

20. The system of claim 12, wherein the regular expression rules comprise sequence of characters that define a search pattern for finding a pattern of data.

* * * * *